US012655943B2

(12) United States Patent
Kim

(10) Patent No.: US 12,655,943 B2
(45) Date of Patent: Jun. 16, 2026

(54) PRESSURE VESSEL

(71) Applicants: Hyundai Motor Company, Seoul (KR); Kia Corporation, Seoul (KR)

(72) Inventor: Chan Jin Kim, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 14 days.

(21) Appl. No.: 18/488,334

(22) Filed: Oct. 17, 2023

(65) Prior Publication Data

US 2024/0369190 A1 Nov. 7, 2024

(30) Foreign Application Priority Data

May 2, 2023 (KR) ........................ 10-2023-0057190

(51) Int. Cl.
*F17C 13/00* (2006.01)

(52) U.S. Cl.
CPC ...... *F17C 13/00* (2013.01); *F17C 2201/0109* (2013.01); *F17C 2203/0604* (2013.01); *F17C 2203/0634* (2013.01)

(58) Field of Classification Search
CPC ........ F17C 2203/0604; F17C 2203/066; F17C 2203/0663; F17C 2205/0305
See application file for complete search history.

(56) References Cited

U.S. PATENT DOCUMENTS

| | | | | |
|---|---|---|---|---|
| 6,227,402 | B1 * | 5/2001 | Shimojima | F17C 1/16 220/661 |
| 9,774,047 | B2 | 9/2017 | Schulze | |
| 11,421,825 | B2 | 8/2022 | Criel | |
| 11,598,487 | B2 | 3/2023 | Lee et al. | |
| 2012/0037641 | A1 * | 2/2012 | Bruce | F17C 13/002 220/589 |
| 2015/0136789 | A1 * | 5/2015 | Nettis | F17C 5/02 220/560.04 |
| 2019/0152312 | A1 * | 5/2019 | Park | B60K 15/03 |
| 2020/0158286 | A1 | 5/2020 | Criel | |
| 2021/0381649 | A1 * | 12/2021 | Puntigam | F17C 1/16 |
| 2021/0396357 | A1 | 12/2021 | Lee et al. | |

(Continued)

FOREIGN PATENT DOCUMENTS

| | | | |
|---|---|---|---|
| KR | 200372069 | * | 1/2005 |
| KR | 200372069 | Y1 | 1/2005 |

(Continued)

OTHER PUBLICATIONS

English Translation of KR200372069 (Year: 2004).*

*Primary Examiner* — Don M Anderson
(74) *Attorney, Agent, or Firm* — Slater Matsil, LLP

(57) ABSTRACT

An embodiment pressure vessel includes a nozzle part, a liner part, and a composite material part. The nozzle part extends upward and includes a first nozzle portion and a second nozzle portion connected to a lower side of the first nozzle portion and having a greater diameter than a diameter of the first nozzle portion, and an area of the second nozzle portion adjacent to the first nozzle portion in a top-down view defines a first boundary area. The liner part defines an inner space and surrounds a lower side of the nozzle part, and an upper end of the liner part covers the first boundary area, and the composite material part is coupled to an outer side of the liner part and is configured to surround the liner part.

20 Claims, 5 Drawing Sheets

(56) References Cited

U.S. PATENT DOCUMENTS

| | | | | |
|---|---|---|---|---|
| 2022/0099250 | A1* | 3/2022 | Song | F17C 1/06 |
| 2022/0154880 | A1* | 5/2022 | Heitz | F17C 13/00 |
| 2022/0214013 | A1* | 7/2022 | Park | F17C 1/00 |
| 2022/0214014 | A1* | 7/2022 | Park | F17C 1/06 |
| 2022/0397237 | A1* | 12/2022 | Dufaure | F17C 1/005 |
| 2022/0412508 | A1* | 12/2022 | Satoya | F17C 1/06 |
| 2023/0060677 | A1* | 3/2023 | Drebes | F17C 1/16 |
| 2024/0159363 | A1* | 5/2024 | Heo | F17C 1/16 |

FOREIGN PATENT DOCUMENTS

| | | | |
|---|---|---|---|
| KR | 20140110903 | A | 9/2014 |
| KR | 102201793 | B1 | 1/2021 |
| KR | 102511650 | B1 | 3/2023 |

* cited by examiner

PRESSURE VESSEL

CROSS-REFERENCE TO RELATED APPLICATIONS

This application claims the benefit of Korean Patent Application No. 10-2023-0057190, filed on May 2, 2023, which application is hereby incorporated herein by reference.

TECHNICAL FIELD

The present disclosure relates to a pressure vessel.

BACKGROUND

Fuel cell electric vehicles (FCEVs) refer to vehicles that travel by supplying power to electric motors using fuel cells. These FCEVs mainly use hydrogen as fuel. Thus, to use the hydrogen, the hydrogen is charged in a pressure vessel and used.

The pressure vessel requires robustness because high-pressure hydrogen should be stored in the pressure vessel. The pressure vessel for storing a high-pressure hydrogen gas is classified into four types: Type I, Type II, Type III, and Type IV, depending on a used material and a method of reinforcing a composite material.

Among them, the Type IV pressure vessel includes a nozzle 1 made of a metallic material, a liner 2 made of a non-metallic material, and a composite material 3 made by winding carbon fibers or glass fibers on the liner 2 in a hoop direction and an axial direction.

FIG. 1 is a cutaway perspective view of the Type IV pressure vessel according to the related art. In FIG. 1, a portion marked with a dark color refers to a portion at which stress concentration of the composite material 3 occurs. As illustrated in FIG. 1, the nozzle 1 has a portion of which a diameter changes so that the nozzle 1 is engaged with the liner 2. However, the hydrogen tries to be discharged to the outside in a high-pressure state and thus presses the nozzle 1 to the outside. In the case of the liner 2, since a surface contour line that is advantageous to structural performance of the composite material is provided, a load may be efficiently handled. However, in the case of a portion of the nozzle 1, which is engaged with the liner 2 and of which the diameter changes, since a surface contour line that is disadvantageous to the composite material 3 in a fillet method or the like to relieve stress of the nozzle 1 is provided, stress concentration having a complex form occurs in the composite material 3. Thus, the portion of the composite material 3 of which the diameter changes of the nozzle 1 is easily broken.

SUMMARY

Embodiments of the present disclosure can solve problems occurring in the prior art while advantages achieved by the prior art are maintained intact.

An embodiment of the present disclosure provides a pressure vessel in which the risk of breakage of a nozzle and a composite is reduced.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, there is provided a pressure vessel including a nozzle part extending upward, a liner part including an inner space and engaged to surround a lower side of the nozzle part, and a composite material part that is coupled to an outer side of the liner part and surrounds the liner part, wherein the nozzle part includes a first nozzle portion and a second nozzle portion connected to a lower side of the first nozzle portion and having a greater diameter than that of the first nozzle portion, and an upper end of the liner part is provided to cover a first boundary area that is an area of the second nozzle portion, which is adjacent to the first nozzle portion, when viewed from the top.

In another example, the first boundary area may be rounded toward an outer side of the nozzle part in a radial direction.

In still another example, the first nozzle portion may have a constant diameter, and an upper end of the composite material part may be in contact with the first nozzle portion.

In yet another example, the liner part may include a first contact portion of which a lower side is in contact with an upper end of the second nozzle portion and an upper end is in contact with the first boundary area, and an upper side of the first contact portion may be formed along an isotensoid curve.

In yet another example, the liner part may further include a second contact portion of which an upper side is in contact with a lower end of the second nozzle portion and which is connected to the first contact portion.

In yet another example, the liner part may further include a body portion of which an upper end is connected to the first contact portion and the second contact portion, and a second boundary area that is a boundary area between the second contact portion and the body portion may be rounded along an outer side in the radial direction.

In yet another example, the nozzle part may further include a first groove recessed downward from an upper surface of the second nozzle portion and a second groove recessed upward from a lower surface of the second nozzle portion, and the liner part further may include a first protrusion protruding downward from the first contact portion and inserted into the first groove and a second protrusion protruding upward from the second contact portion and inserted into the second groove.

In yet another example, the first groove may include a $(1\text{-}1)^{th}$ groove extending downward from the upper surface of the second nozzle portion and a $(1\text{-}2)^{th}$ groove extending inward from a lower end of the $(1\text{-}1)^{th}$ groove in the radial direction, and the second groove may include a $(2\text{-}1)^{th}$ groove extending upward from the lower surface of the second nozzle portion and a $(2\text{-}2)^{th}$ groove extending outward from an upper end of the $(2\text{-}1)^{th}$ groove in the radial direction.

In yet another example, the first protrusion may be formed to correspond to a shape of the first groove, and the second protrusion may be formed to correspond to a shape of the second groove.

In yet another example, the nozzle part may further include a third groove recessed upward from the lower surface of the second nozzle portion and formed inside the second groove in the radial direction, and the liner part may further include a third protrusion protruding upward from an inner end of the second contact portion in the radial direction and inserted into the third groove.

In yet another example, a length of the third groove in the radial direction may be greater than a length of the third protrusion in the radial direction.

In yet another example, the pressure vessel may further include an airtight part that is disposed inside the third protrusion in the radial direction, is inserted into the third groove, and maintains airtightness between the third protrusion and the third groove.

In yet another example, the second nozzle portion may include a $(2\text{-}1)^{th}$ nozzle area of which a diameter increases toward a lower side and a $(2\text{-}2)^{th}$ nozzle area which is connected to a lower side of the $(2\text{-}1)^{th}$ nozzle area and of which a diameter decreases toward the lower side.

In yet another example, a first length that is a length by which a boundary portion between the $(2\text{-}1)^{th}$ nozzle area and the $(2\text{-}2)^{th}$ nozzle area protrudes from the first nozzle portion in the radial direction of the nozzle part may be smaller than a second length that is a length of the second nozzle portion in an up-down direction.

In yet another example, the composite material part may be formed by a winding band having a predetermined width and surrounding the liner part, and the first length may be greater than a width of the winding band.

In yet another example, a length of the first nozzle portion in the radial direction of the nozzle part is 35% or less of a longest length among lengths of the liner part in the radial direction.

BRIEF DESCRIPTION OF THE DRAWINGS

The above and other objects, features, and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
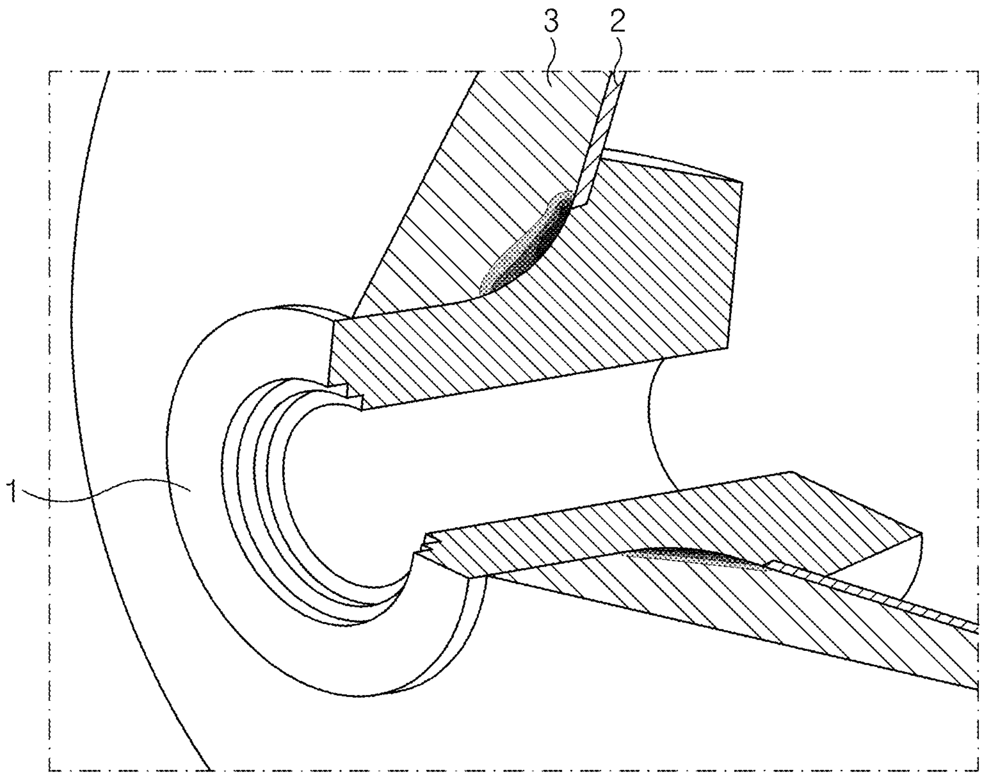
FIG. 1 is a cutaway perspective view of a Type IV pressure vessel according to the related art.

Hereinafter, some embodiments of the present disclosure will be described in detail with reference to the exemplary drawings. When components in the drawings are designated by reference numerals, the same components have the same reference numerals as far as possible even though the components are illustrated in different drawings. Further, in the description of the embodiments of the present disclosure, when it is determined that a detailed description of a related well-known configuration or function disturbs understanding of the embodiments of the present disclosure, the detailed description will be omitted.

Figure 2:
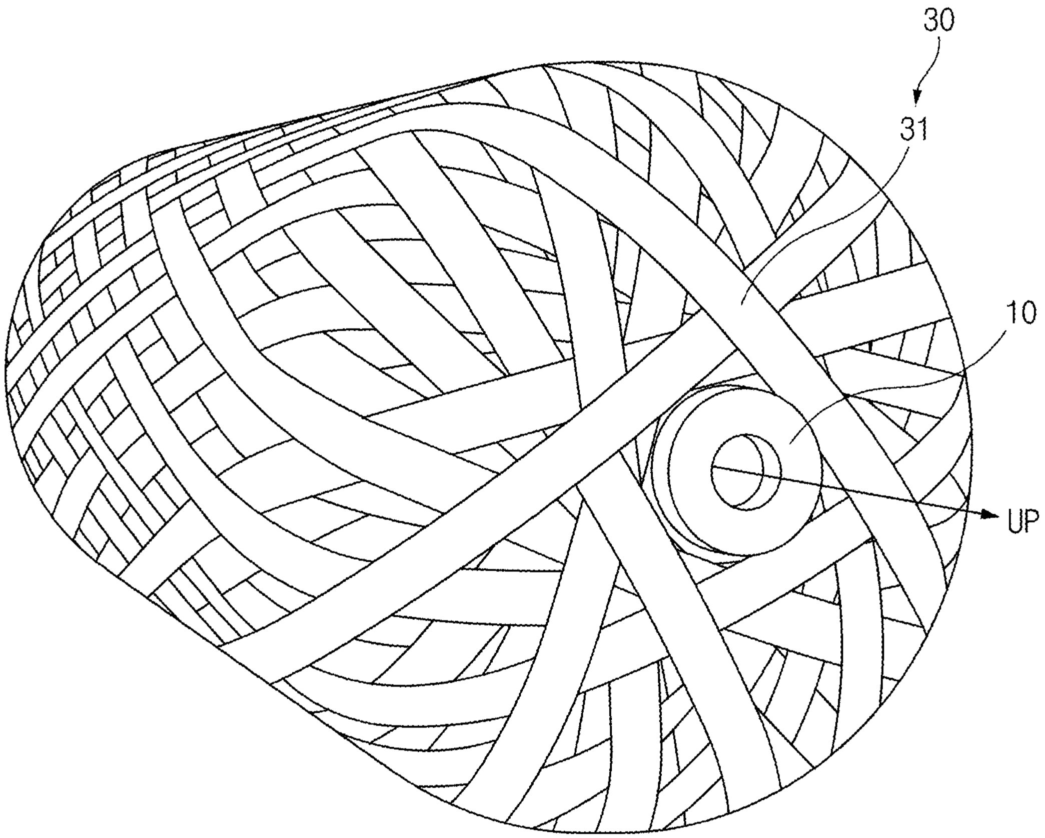
FIG. 2 is a view illustrating a pressure vessel according to an embodiment of the present disclosure.
Figure 3:
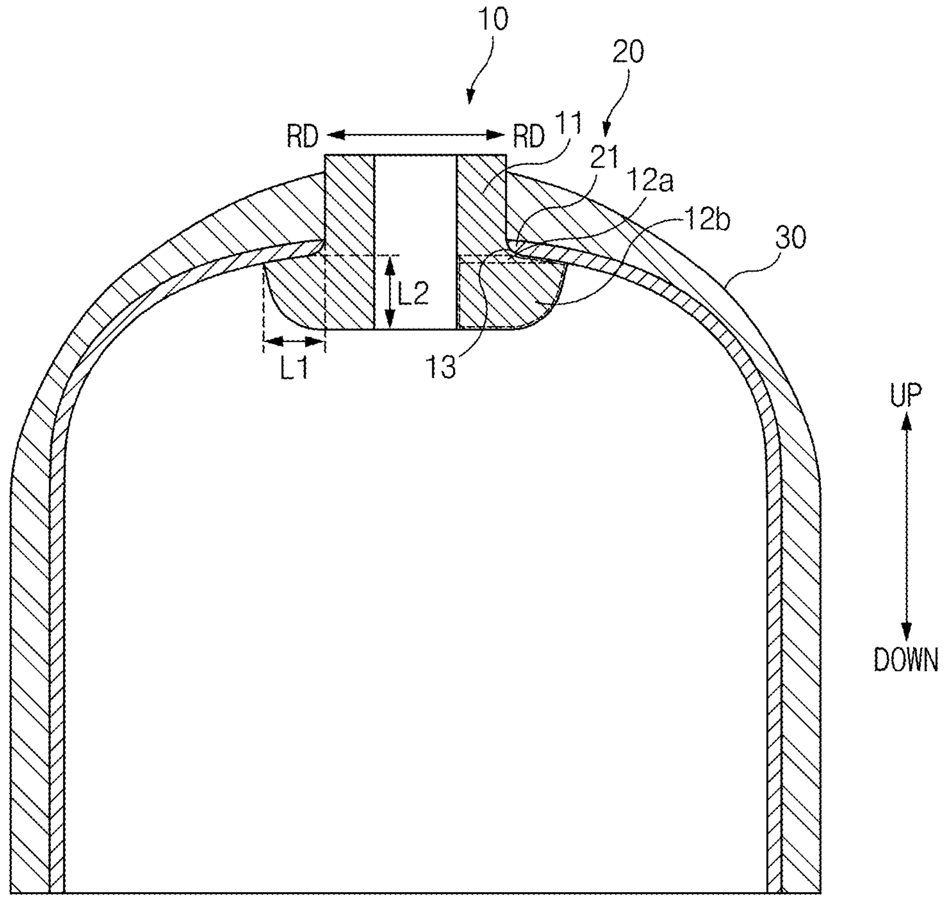
FIG. 3 is a cross-sectional view illustrating the pressure vessel according to the embodiment of the present disclosure.

A pressure vessel according to embodiments of the present disclosure may relate to a pressure vessel used in a moving device using a hydrogen fuel cell. FIG. 2 is a view illustrating a pressure vessel according to an embodiment of the present disclosure. FIG. 3 is a cross-sectional view illustrating the pressure vessel according to the embodiment of the present disclosure.

The pressure vessel according to the present embodiment of the present disclosure may include a nozzle part 10, a liner part 20, and a composite material part 30. The nozzle part 10 may have a shape extending upward. The nozzle part 10 may protrude upward as compared to an upper end of the composite material part 30. As the nozzle part 10 protrudes upward as compared to the upper end of the composite material part 30, a shock that may be applied to the composite material part 30 due to a drop of the pressure vessel or the like may be minimized.

In the present specification, an up-down direction is referred to for convenience of description and is determined relative to a direction in which the pressure vessel is disposed. Further, the up-down direction may not necessarily refer to a vertical direction.

The nozzle part 10 may include a first nozzle portion 11 and a second nozzle portion 12. The second nozzle portion 12 may be a portion connected to a lower side of the first nozzle portion 11 and having a greater diameter than that of the first nozzle portion 11.

The liner part 20 may include an inner space and may be engaged to surround a lower side of the nozzle part 10. The liner part 20 may be made of a plastic material but embodiments of the present disclosure are not limited thereto. The liner part 20 may be provided to prevent hydrogen from permeating to the outside.

The composite material part 30 may be coupled to an outer side of the liner part 20 and provided to surround the liner part 20. The composite material part 30 may be formed by a winding band 31. As illustrated in FIG. 2, the winding band 31 may have a predetermined width and surround the liner part 20.

When viewed from the top, an upper end of the liner part 20 may be provided to cover a first boundary area 13. The first boundary area 13 may be an area of the second nozzle portion 12, which is adjacent to the first nozzle portion 11. The first boundary area 13 may refer to an area of the nozzle part 10, of which the diameter starts to be changed. As an example, the upper end of the liner part 20 may be in close contact with the first boundary area 13.

The first boundary area 13 may be rounded toward an outer side of the nozzle part 10 in a radial direction RD. Hereinafter, the radial direction RD is based on the nozzle part 10. As an example, the radial direction RD may refer to the radial direction RD of a virtual circle perpendicular to the up-down direction. The outer side in the radial direction RD may refer to a side away from a center of the nozzle part 10 in the radial direction RD.

The fact that the first boundary area 13 is rounded may refer to a state in which the first boundary area 13 has a predetermined curvature when the nozzle part 10 is cut along a plane parallel to the up-down direction. As the first boundary area 13 is rounded, stress applied to the first boundary area 13 may be reduced as compared to a case in which the first boundary area 13 is not rounded.

A direction in which the winding band 31 surrounds the liner part 20 may be a direction transverse to the up-down direction. As an example, the direction in which the winding band 31 surrounds the liner part 20 may refer to an angle of 20 degrees or less with respect to the up-down direction. In this case, the direction in which the winding band 31 surrounds the liner part 20 may refer to a direction in which the winding band 31 extends with respect to a starting point of the winding band 31.

As described above, the direction in which the winding band 31 surrounds the liner part 20 may form an angle of 20 degrees or less with respect to the up-down direction. To form this angle, a length of the first nozzle portion 11 in the radial direction RD of the nozzle part 10 may be formed to 35% or less of the longest length among lengths of the liner part 20 in the radial direction RD.

The first nozzle portion 11 may have a constant diameter. In this case, the upper end of the composite material part 30 may be in contact with the first nozzle portion 11. This may mean that the composite material part 30 is not in contact with the first boundary area 13 and is disposed adjacent to an upper side of the first boundary area 13.

Meanwhile, the liner part 20 may include a first contact portion 21. A lower side of the first contact portion 21 may be in contact with an upper end of the second nozzle portion 12, and an upper end thereof may be in contact with the first boundary area 13. An upper side of the first contact portion 21 may be formed along an isotensoid curve.

In the pressure vessel according to the present embodiment of the present disclosure, since the upper end of the liner part 20 covers the first boundary area 13, the stress concentration by the nozzle part 10 is not directly transferred to the composite material part 30, and thus the risk of breakage of the composite material part 30 may be reduced.

The second nozzle portion 12 may include a (2-1)$^{th}$ nozzle area 12$a$ and a (2-2)$^{th}$ nozzle area 12$b$. The (2-1)$^{th}$ nozzle area 12$a$ may be an area of which a diameter increases along a lower side. The (2-2)$^{th}$ nozzle area 12$b$ may be an area which is connected to a lower side of the (2-1)$^{th}$ nozzle area 12$a$ and of which a diameter decreases along the lower side.

For convenience of description, a length by which a boundary portion between the (2-1)$^{th}$ nozzle area 12$a$ and the (2-2)$^{th}$ nozzle area 12$b$ protrudes from the first nozzle portion 11 in the radial direction RD is referred to as a first length L1, and a length of the second nozzle portion 12 in the up-down direction is referred to as a second length L2. The first length L1 may be smaller than the second length L2.

When the first length L1 become greater than the second length L2, when a pressure is applied upward to the nozzle part 10, bending stress increases toward the second nozzle portion 12, and thus a structure may be vulnerable to fracture. When the second nozzle portion 12 is broken, the nozzle part 10 escapes upward due to high-pressure hydrogen, and a serious accident may occur. Thus, the first length L1 may be smaller than the second length L2.

However, even when the first length L1 is too small, the nozzle part 10 may escape upward. When the winding band 31 covers at least a portion of an upper side of the second nozzle portion 12, the nozzle part 10 may be prevented from escaping upward. Thus, the first length L1 may be greater than a width of the winding band 31 so that the winding band 31 may effectively prevent the nozzle part 10 from escaping upward.

Figure 4:
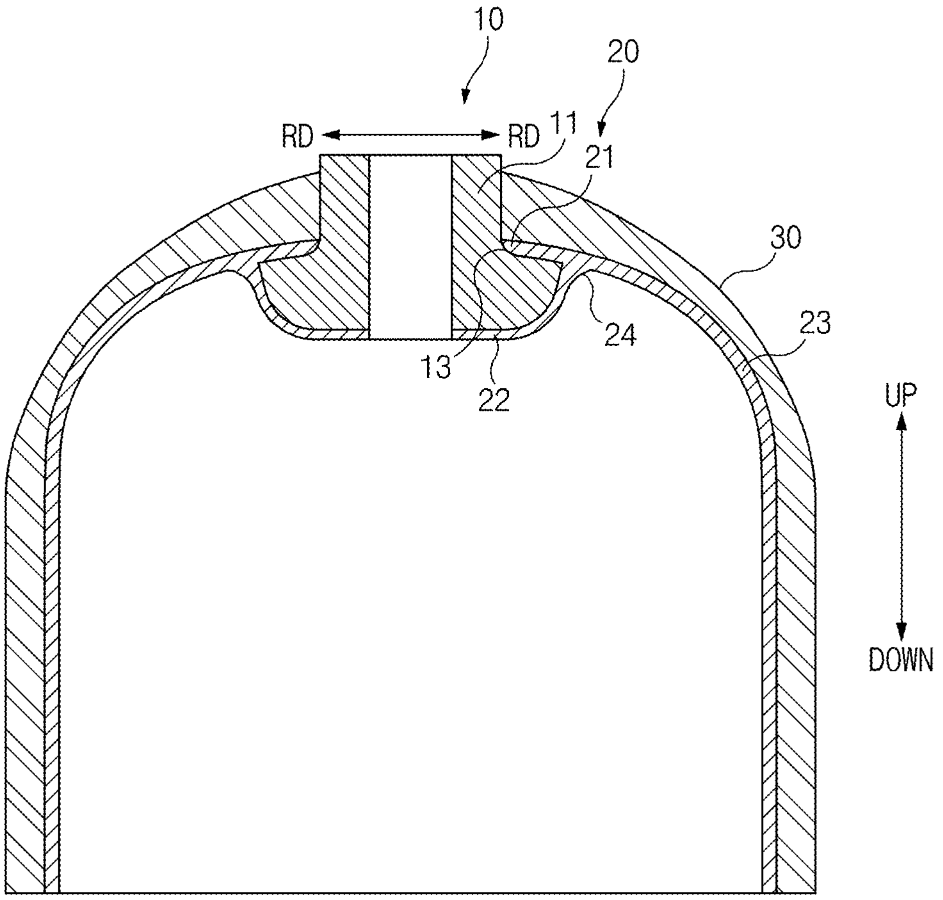
FIG. 4 is a cross-sectional view illustrating a pressure vessel according to another embodiment of the present disclosure.

FIG. 4 is a cross-sectional view illustrating a pressure vessel according to another embodiment of the present disclosure. Hereinafter, the pressure vessel according to another embodiment of the present disclosure will be described in detail with reference to FIG. 4. The pressure vessel according to another embodiment of the present disclosure differs from the pressure vessel according to the embodiment of the present disclosure in that a second contact portion 22 is further included. The same or equivalent components as those of the pressure vessel according to the embodiment are designated by the same or equivalent reference numerals, and a detailed description thereof will be omitted.

The liner part 20 may further include the second contact portion 22. The second contact portion 22 may be a portion of which an upper side is in contact with a lower end of the second nozzle portion 12 and which is connected to the first contact portion 21.

The liner part 20 may further include a body portion 23. The body portion 23 may be a portion of which an upper end is connected to the first contact portion 21 and the second contact portion 22.

A second boundary area 24 may be rounded along an outer side in the radial direction RD. The second boundary area 24 may be a boundary area between the second contact portion 22 and the body portion 23. As the second boundary area 24 is rounded along the outer side in the radial direction RD, stress generated as the nozzle part 10 is pressed upward and applied to the second boundary area 24 may be reduced as compared to a case in which the second boundary area 24 is not rounded.

In the pressure vessel according to another embodiment of the present disclosure, as the liner part 20 includes the second contact portion 22, a contact area between the nozzle part 10 and the liner part 20 increases as compared to a case in which only the first contact portion 21 is included, and thus the nozzle part 10 may be effectively restrained. Thus, the escaping of the nozzle part 10 may be further prevented.

Figure 5:
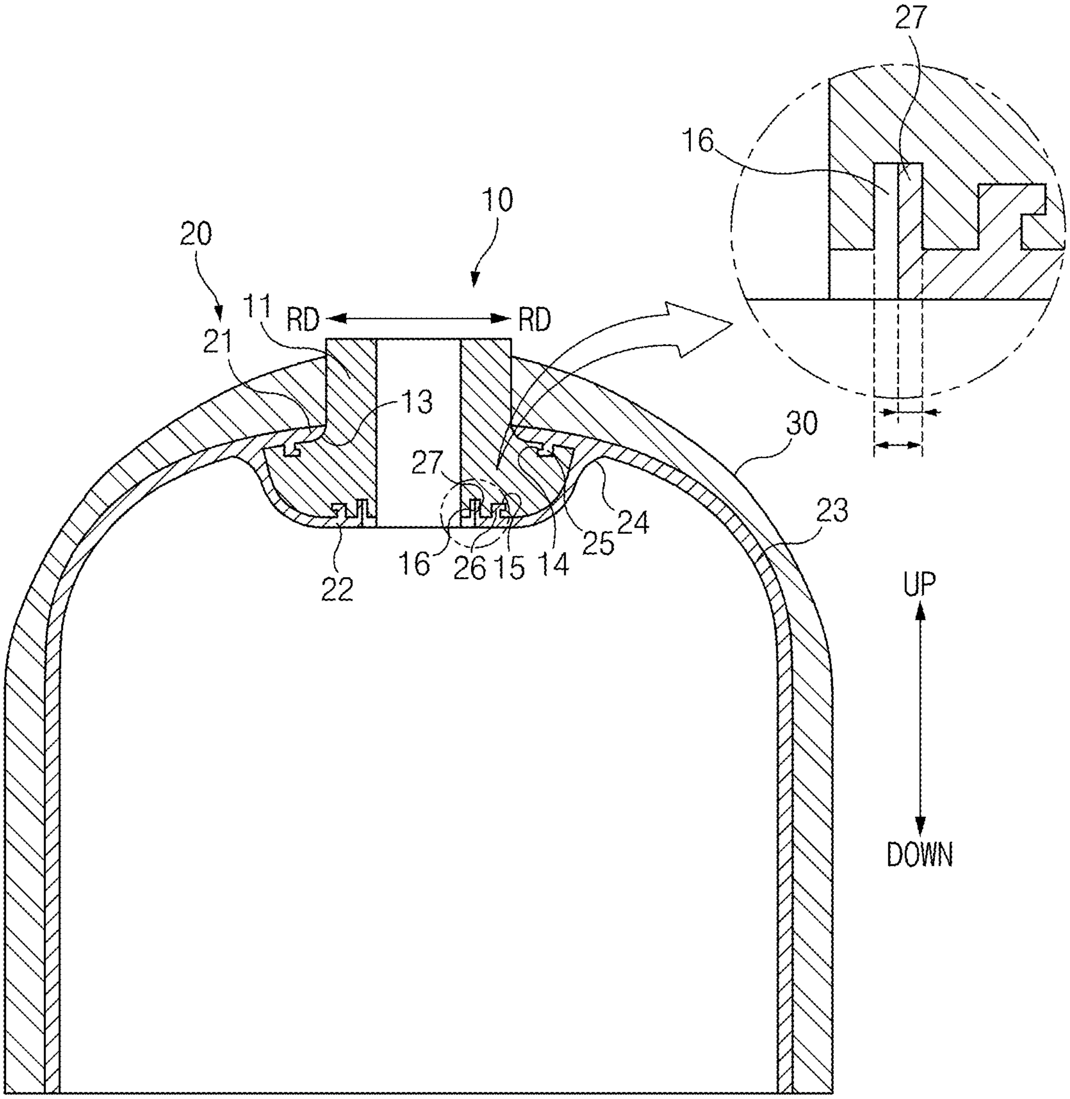
FIG. 5 is a cross-sectional view illustrating a pressure vessel according to still another embodiment of the present disclosure.

FIG. 5 is a cross-sectional view illustrating a pressure vessel according to still another embodiment of the present disclosure. Hereinafter, the pressure vessel according to still another embodiment of the present disclosure will be described in detail with reference to FIG. 5. The pressure vessel according to still another embodiment of the present disclosure differs from the pressure vessel according to another embodiment of the present disclosure in that a groove and protrusion structure is further included. The same or equivalent components as those of the pressure vessel according to another embodiment of the present disclosure are designated by the same or equivalent reference numerals, and a detailed description thereof will be omitted.

The nozzle part 10 may include a first groove 14. The first groove 14 may be recessed downward from an upper surface of the second nozzle portion 12. The liner part 20 may include a first protrusion 25. The first protrusion 25 may protrude downward from the first contact portion 21 and may be inserted into the first groove 14.

The nozzle part 10 may include a second groove 15. The second groove 15 may be recessed upward from a lower surface of the second nozzle portion 12. The liner part 20 may include a second protrusion 26. The second protrusion 26 may protrude upward from the second contact portion 22 and may be inserted into the second groove 15.

As an example, the first groove 14 may include a (1-1)$^{th}$ groove and a (1-2)$^{th}$ groove. The (1-1)$^{th}$ groove may extend downward from the upper surface of the second nozzle portion 12. The (1-2)$^{th}$ groove may extend inward from a lower end of the (1-1)$^{th}$ groove in the radial direction RD. As illustrated in FIG. 5, a cross section of the first groove 14 may be similar to a shape obtained by rotating an L shape.

The second groove 15 may include a (2-1)$^{th}$ groove and a (2-2)$^{th}$ groove. The (2-1)$^{th}$ groove may extend upward from the lower surface of the second nozzle portion 12. The (2-2)$^{th}$ groove may extend outward from an upper end of the (2-1)$^{th}$ groove in the radial direction RD. As illustrated in FIG. 5, a cross section of the second groove 15 may be similar to a shape obtained by rotating an L shape.

The first protrusion 25 may be formed to correspond to the shape of the first groove 14. The second protrusion 26 may be formed to correspond to the shape of the second groove 15.

The nozzle part 10 may include a third groove 16. The third groove 16 may be recessed upward from the lower surface of the second nozzle portion 12 and may be formed inside the second groove 15 in the radial direction RD. The liner part 20 may further include a third protrusion 27. The third protrusion 27 may protrude upward from an inner end of the second contact portion 22 in the radial direction RD and may be inserted into the third groove 16. This may mean that a distal end of the second contact portion 22 is caught by the third groove 16 formed in the nozzle part 10.

As an example, a length of the third groove 16 in the radial direction RD may be greater than a length of the third protrusion 27 in the radial direction RD. This may mean that an extra space is present in the third groove 16 even after the third protrusion 27 is disposed.

The pressure vessel according to still another embodiment of the present disclosure may further include an airtight part (not illustrated). The airtight part may maintain airtightness between the third protrusion 27 and the third groove 16. The airtight part may be an O-ring. The airtight part may be disposed inside the third protrusion 27 in the radial direction RD and inserted into the third groove 16.

In the pressure vessel according to still another embodiment of the present disclosure, since a contact area further increases through the groove and protrusion structure, the escaping of the nozzle part 10 may be further prevented.

According to embodiments of the present disclosure, a liner part covers a portion of a nozzle in which a diameter changes so that complex stress concentration applied to a composite material part may be resolved, and a fillet or the like is inserted into the portion of the nozzle in which the diameter changes so that deformation and breakage of the nozzle may be suppressed. Further, since the nozzle has a portion protruding further from the composite material part, an impact that may be applied to the composite material part due to a drop of a tank may be minimized.

The above description is merely illustrative of the technical spirit of the present disclosure, and those skilled in the art to which the present disclosure belongs may make various modifications and changes without departing from the essential features of embodiments of the present disclosure. Thus, the embodiments disclosed in the present disclosure are not intended to limit the technology spirit of the present disclosure, but are intended to describe exemplary embodiments of the present disclosure, and the scope of the technical spirit of the present disclosure is not limited by these embodiments. The scope of protection of the present disclosure should be interpreted by the appended claims, and all technical spirits within the scope equivalent thereto should be interpreted as being included in the scope of the present disclosure.

What is claimed is:

1. A pressure vessel comprising:
a nozzle part comprising:
a first nozzle portion; and
a second nozzle portion connected to a lower side of the first nozzle portion and having a second diameter equal or greater than a first diameter of the first nozzle portion, wherein an area of the second nozzle portion adjacent to the first nozzle portion defines a first boundary area;
a liner part defining an inner space and surrounding a lower side of the nozzle part, wherein an upper end of the liner part covers the first boundary area; and
a composite material part coupled to an outer side of the liner part and configured to surround the liner part,
wherein the first boundary area is the area of the second nozzle portion in which the second diameter starts to change from a small size to a big size,
wherein at least a portion of the upper end of the liner part is disposed between the composite material part and the first boundary area, and
wherein an upper end of the composite material part is in contact with the first nozzle portion.

2. The pressure vessel of claim 1, wherein the first boundary area is rounded toward an outer side of the nozzle part in a radial direction of the nozzle part.

3. The pressure vessel of claim 2, wherein
the first nozzle portion has a constant diameter.

4. The pressure vessel of claim 3, wherein:
the liner part comprises a first contact portion;
a lower side of the first contact portion is in contact with an upper end of the second nozzle portion;
an upper end of the first contact portion is in contact with the first boundary area; and
an upper side of the first contact portion is disposed along an isotensoid curve.

5. The pressure vessel of claim 4, wherein:
the liner part further comprises a second contact portion; and
an upper side of the second contact portion is in contact with a lower end of the second nozzle portion and is connected to the first contact portion.

6. The pressure vessel of claim 5, wherein:
the liner part further comprises a body portion;
an upper end of the body portion is connected to the first contact portion and the second contact portion;
a boundary area between the second contact portion and the body portion defines a second boundary area; and
the second boundary area is rounded along an outer side in the radial direction.

7. The pressure vessel of claim 5, wherein:
the nozzle part further comprises:
a first groove recessed downward from an upper surface of the second nozzle portion; and
a second groove recessed upward from a lower surface of the second nozzle portion; and
the liner part further comprises:
a first protrusion protruding downward from the first contact portion and inserted into the first groove; and
a second protrusion protruding upward from the second contact portion and inserted into the second groove.

8. The pressure vessel of claim 7, wherein:
the first groove comprises:
a first elongated groove extending downward from the upper surface of the second nozzle portion; and
a second elongated groove extending inward from a lower end of the first elongated groove in the radial direction; and
the second groove comprises:
a first elongated groove extending upward from the lower surface of the second nozzle portion; and
a second elongated groove extending outward from an upper end of the first elongated groove of the second groove in the radial direction.

9. The pressure vessel of claim 7, wherein:
a shape of the first protrusion corresponds to a shape of the first groove; and
a shape of the second protrusion corresponds to a shape of the second groove.

10. The pressure vessel of claim 7, wherein:

the nozzle part further comprises a third groove recessed upward from the lower surface of the second nozzle portion and disposed inside the second groove in the radial direction; and the liner part further comprises a third protrusion protruding upward from an inner end of the second contact portion in the radial direction and inserted into the third groove.

11. The pressure vessel of claim 10, wherein a length of the third groove in the radial direction is greater than a length of the third protrusion in the radial direction.

12. The pressure vessel of claim 1, wherein a length of the first nozzle portion in a radial direction of the nozzle part is 35% or less of a longest length among lengths of the liner part in the radial direction.

13. A pressure vessel comprising:

a nozzle part comprising:

a first nozzle portion; and a second nozzle portion connected to a lower side of the first nozzle portion and having a second diameter equal or greater than a first diameter of the first nozzle portion, wherein an area of the second nozzle portion adjacent to the first nozzle portion defines a first boundary area, and wherein the second nozzle portion comprises:

a first nozzle area having a diameter that increases toward a lower side; and a second nozzle area connected to a lower side of the first nozzle area and having a diameter that decreases toward the lower side;

a liner part defining an inner space and surrounding a lower side of the nozzle part, wherein an upper end of the liner part covers the first boundary area; and a composite material part coupled to an outer side of the liner part and configured to surround the liner part, wherein the first boundary area is the area of the second nozzle portion in which the second diameter starts to change from a small size to a big size, wherein at least a portion of the upper end of the liner part is disposed between the composite material part and the first boundary area, and wherein an upper end of the composite material part is in contact with the first nozzle portion.

14. The pressure vessel of claim 13, wherein a first length that is a length by which a boundary portion between the first nozzle area and the second nozzle area protrudes from the first nozzle portion in a radial direction of the nozzle part is smaller than a second length that is a length of the second nozzle portion in an up-down direction.

15. The pressure vessel of claim 14, wherein:

the composite material part comprises a winding band having a predetermined width surrounding the liner part; and the first length is greater than a width of the winding band.

16. The pressure vessel of claim 13, wherein:

the first boundary area is rounded toward an outer side of the nozzle part in a radial direction of the nozzle part;

the first nozzle portion has a constant diameter;

the liner part comprises a first contact portion;

a lower side of the first contact portion is in contact with an upper end of the second nozzle portion;

an upper end of the first contact portion is in contact with the first boundary area;

an upper side of the first contact portion is disposed along an isotensoid curve;

the liner part further comprises a second contact portion; and an upper side of the second contact portion is in contact with a lower end of the second nozzle portion and is connected to the first contact portion.

17. The pressure vessel of claim 16, wherein:

the liner part further comprises a body portion;

an upper end of the body portion is connected to the first contact portion and the second contact portion;

a boundary area between the second contact portion and the body portion defines a second boundary area; and the second boundary area is rounded along an outer side in the radial direction.

18. The pressure vessel of claim 16, wherein:

the nozzle part further comprises:

a first groove recessed downward from an upper surface of the second nozzle portion;

a second groove recessed upward from a lower surface of the second nozzle portion;

a third groove recessed upward from the lower surface of the second nozzle portion and disposed inside the second groove in the radial direction; and the liner part further comprises:

a first protrusion protruding downward from the first contact portion and inserted into the first groove;

a second protrusion protruding upward from the second contact portion and inserted into the second groove; and a third protrusion protruding upward from an inner end of the second contact portion in the radial direction and inserted into the third groove.

19. The pressure vessel of claim 18, wherein:

the first groove comprises:

a first elongated groove extending downward from the upper surface of the second nozzle portion; and a second elongated groove extending inward from a lower end of the first elongated groove in the radial direction; and the second groove comprises:

a first elongated groove extending upward from the lower surface of the second nozzle portion; and a second elongated groove extending outward from an upper end of the first elongated groove of the second groove in the radial direction.

20. A pressure vessel comprising:

a nozzle part comprising:

a first nozzle portion; and a second nozzle portion connected to a lower side of the first nozzle portion and having a second diameter equal or greater than a first diameter of the first nozzle portion, wherein an area of the second nozzle portion adjacent to the first nozzle portion defines a first boundary area, and wherein the second nozzle portion comprises:

a first nozzle area having a diameter that increases toward a lower side; and a second nozzle area connected to a lower side of the first nozzle area and having a diameter that decreases toward the lower side;

a liner part defining an inner space and surrounding a lower side of the nozzle part, wherein an upper end of the liner part covers the first boundary area; and a composite material part coupled to an outer side of the liner part and configured to surround the liner part, wherein a first length, which is a length by which a boundary portion between the first nozzle area and the second nozzle area protrudes from the first nozzle portion in a radial direction of the nozzle part, is smaller than a second length, which is a length of the second nozzle portion in an up-down direction, wherein the composite material part comprises a winding band having a predetermined width surrounding the liner part, and wherein the first length is greater than a width of the winding band.

* * * * *